United States Patent [19]
Maistrelli

[11] 3,860,074
[45] Jan. 14, 1975

[54] ELECTRO-HYDRAULIC DEVICE FOR LIFTING TRACTOR-DRAWN AGRICULTURAL IMPLEMENTS

[75] Inventor: Roger Maistrelli, Billancourt, France

[73] Assignee: Regie Nationale Des Usines Renault, Billancourt, France

[22] Filed: Feb. 15, 1973

[21] Appl. No.: 332,628

[30] Foreign Application Priority Data
Feb. 17, 1972 France.............................. 72.05366

[52] U.S. Cl.......................................... 172/7, 172/9
[51] Int. Cl............................................ A01b 63/112
[58] Field of Search.................................... 172/7, 9

[56] References Cited
UNITED STATES PATENTS
| | | | |
|---|---|---|---|
| 2,974,734 | 3/1961 | Kienzle | 172/9 |
| 3,128,830 | 4/1964 | Doering | 172/7 |
| 3,422,906 | 1/1969 | Bunting et al. | 172/9 |

*Primary Examiner*—Stephen C. Pellegrino
*Attorney, Agent, or Firm*—Stevens, Davis, Miller & Mosher

[57] ABSTRACT

This electro-hydraulic device for lifting tractor-drawn agricultural implements comprises a first sensor delivering a voltage subordinate to the actual displacement of a tractive effort transmission member, a second sensor delivering another voltage subordinate to a tractive effort display, a governor comprising a first control path delivering a voltage subordinate to the discrepancy between the two voltages delivered by said sensors and supplying its voltage to an assembly for adjusting the fluid output to said implement lifting actuator via an auxiliary actuator adapted to monitor the output of a main feed pump for supplying fluid to said lifting actuator, said tractive effort transmission member comprising a shaft having at its ends anchor points for the traction arms and being associated with a pair of spring blades located adjacent supports and adapted to urge said shaft towards the tractor chassis.

12 Claims, 5 Drawing Figures

ELECTRO-HYDRAULIC DEVICE FOR LIFTING TRACTOR-DRAWN AGRICULTURAL IMPLEMENTS

The present invention relates to farming machines in general and has particular reference to electro-hydraulic devices for lifting tractor-drawn agricultural implements permitting of controlling both the equipment position and the tractive effort.

Devices for automatically lifting tractor-drawn implements are already known; they enable the driver to select the working depth of the implements or the tractive effort of the tractor as a function of the nature of the soil, of the work to be done and of the tractor speed.

Hitherto known devices of this character comprise a first control lever for displaying the implements position and a second control lever for displaying the tractive effort, both levers enabling the driver to display either a normal working depth and a maximum tractive effort beyond which the device will control automatically the lifting of the implements, or a normal tractive effort with a maximum working depth of the equipments.

According to the relative positions of these two display control levers, it is possible to work the soil by controlling either the working depth while limiting the tractive effort, or the tractive effort while limiting said depth.

As a rule, the cylinder or actuator controlling the lifting movement of the agricultural implements associated with a tractor is of the single-acting type and its hydraulic control unit comprises a first distributor for feeding fluid under pressure into the chamber of the actuator cylinder controlling the upward or lifting movement of the equipment, and a second distributor for exhausting the fluid from said chamber and thus permit the downward movement of the equipment. These distributors are controlled mechanically as a function of the discrepancies between the actual working depth and the displayed or preset depth, and as a function of the discrepancies between the actual tractive effort and the displayed or preset tractive effort. This hydraulic unit further comprises a selector controlling by priority the upward movement of the equipments. Now these known control devices, notably the effort controlling ones, are relatively complicated and cumbersome, and require frequent and careful adjustments.

It is the primary object of this invention to provide a device for lifting through electro-hydraulic means agricultural tractor-drawn implements equipped with means for measuring the tractive effort, the present device being relatively economical to manufacture and particularly simple to adjust or reset.

It is another object of this invention to provide a reliable tractive effort sensor of reduced over-all dimensions, which is constructionally economical and comprises a knock-off safety device becoming operative in case of abnormal tractive effort.

A further object of the present invention comprises an electro-hydraulic lifting device controlled through said tractive effort measuring means for controlling either the working depth of the implements while limiting the effort, or the tractive effort while limiting the working depth of the tools or equipments.

Another complementary object of this invention lies in an electro-hydraulic lifting device capable of eliminating power losses due to the throttling of oil and affording an automatic discharge of the feed pump of the hydraulic circuit when the implements are properly positioned.

This electro-hydraulic lifting device for tools or like agricultural implements of farming tractors which comprises a main hydraulic pump, a tool lifting actuator, means for adjusting the fluid input and output of said lifting actuator, means for displaying the tractive effort, a first resilient member for measuring the tractive effort exerted on the tools, a governor for controlling the lifting acutator output adjustment means, a second resilient member for transmitting the tractive effort, and a first set of sensors for detecting the position of said display means and said first resilient member, is characterised essentially in that a first sensor for detecting the position of said first resilient member for measuring the tractive effort delivers a first voltage subordinate to the actual movement of said resilient member, that a second sensor delivers a second voltage subordinate to the position of the display means indicating the value of the displayed tractive effort, and that said governor comprises a first control path delivering a third electric voltage subordinate to the discrepancy between said first and second voltages, and that said third voltage is fed to the lifting actuator output adjustment means through the medium of another actuator for monitoring the output of the main hydraulic pump.

Other features and advantages of this invention will appear as the following description proceeds with reference to the attached drawings illustrating diagrammatically by way of example a typical form of embodiment of the lifting device of this invention. In the drawings.

Figure 1:
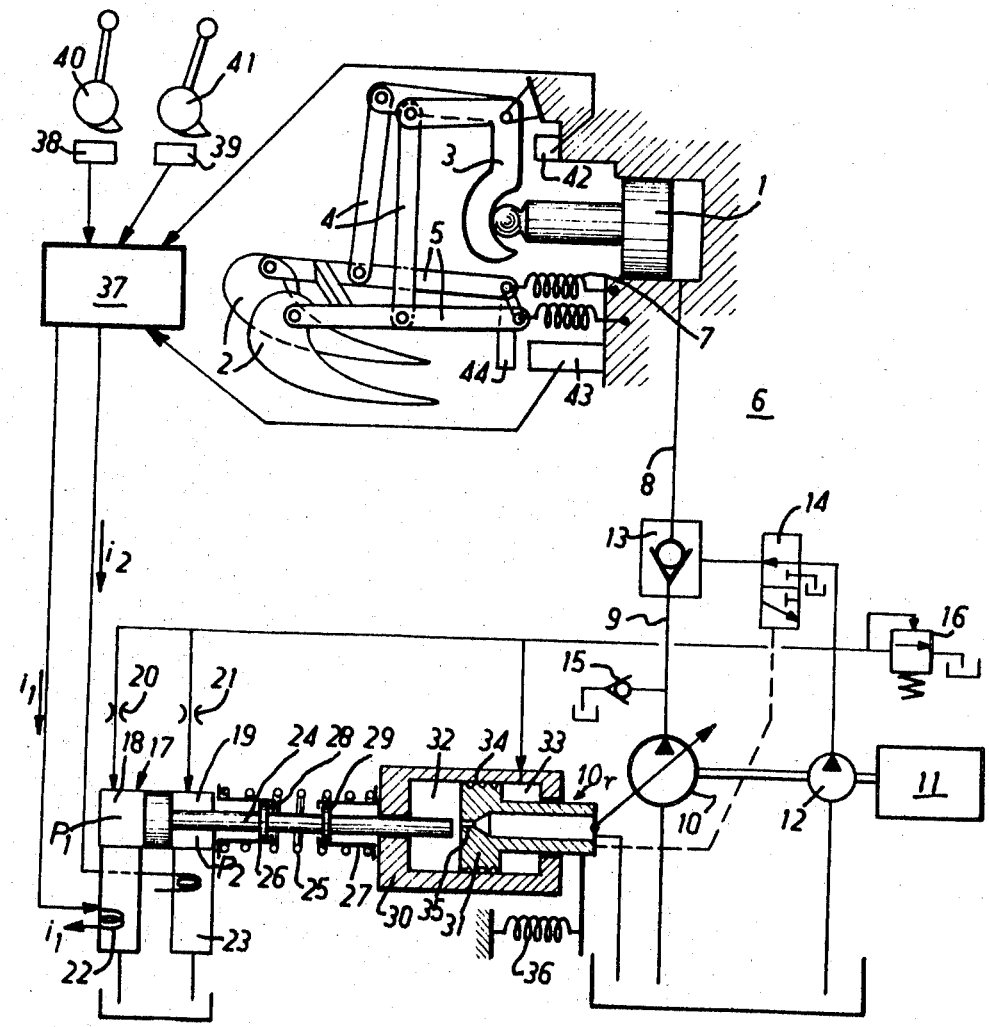
FIG. 1 illustrates diagrammatically the general arrangement of the implement lifting system of this invention.

Referring first to FIG. 1, it will be seen that the lifting device comprises essentially a single-acting actuator 1 having its piston rod connected to the agricultural implements 2 via a double cranked lever 3 having its outer ends connected to the upper ends of a pair of suspension links 4 of which the lower ends are pivotally connected to corresponding traction arms 5. These draft links 5 are connected in turn to the tractor frame 6 through a pair of resilient members 7 having a relatively great rigidity.

The inner chamber of actuator 1 is connected via pipe lines 8 and 9 to a main hydraulic displacement pump 10 of variable variable output, adapted to deliver fluid under pressure in either direction. This pump 10 is driven from the internal combustion engine 11 of the tractor in conjunction with an auxiliary pump 12.

Inserted between the main pump 10 and the actuator 1, i.e. between lines 8 and 9, is a non-return valve 13 monitored by the pressure produced by the auxiliary pump 12. A valve 14 is controlled through mechanical means by the device controlling the variation in the volumetric capacity of the main pump 10, and is adapted to cut off the monitoring pressure of valve 13 when the volumetric capacity of the main pump 10 is nearly zero.

Another non-return valve 15 is branched off the pipe line 9 of pump 10 to prevent this pump from producing any cavitation when drawing fluid from the actuator 1 and when the non-return valve 13 is closed. An adjustable valve 16 controls the output pressure of the auxiliary pump 12.

The means controlling the variation in the volumetric capacity of the main pump 10 comprises a double-acting monitoring actuator 17 having its chambers 18 and 19 adapted to be supplied with fluid from the auxiliary pump 12 via a pair of gauged orifices 20 and 21. A pair of solenoid-operated valves 22, 23 are provided for adjusting the pressure in chambers 18, 19 respectively as a function of their energizing current $i_1$, $i_2$. The orifices 20 and 21 are gauged as a function of the fluid output necessary for obtaining the desired rate of movement of the piston rod 24 of actuator 17. A spring 25 is slightly prestressed by a pair of flanged cup-shaped members 26, 27 slidably mounted on said piston rod 24, the latter comprising a pair of abutment members 28 and 29, as shown. Thus, the spring 25 constantly urges the piston rod 24 of actuator 17 to its central position when the value of pressures P1 and P2 in chambers 18 and 19, respectively, is zero. A specific position of said piston rod 24 (depending on the flexibility of spring 25) is obtained for each positive value of said pressure P1, P2. This rod 24 controls a stress multiplier or amplifier comprising a cylinder 30 and a piston 31 forming a pair of chambers 32 and 33 of different cross-sectional areas. These chambers are interconnected by an element adapted to produce a loss of pressure, such as a helical groove 34 machined in the outer peripheral surface of piston 31.

The chamber 33 having the smaller cross-sectional area is supplied directly with fluid under pressure from the auxiliary pump 12. The pressure-loss element 34 permits of supplying fluid to the chamber 32 having the larger cross-sectional area, the exhaust to the fluid reservoir being via an orifice 35 formed in the piston 31 and having a cross-sectional passage area subordinate to the distance between the end of piston rod 24 and the front face of piston 31.

The pressure in chamber 32 attains automatically the value necessary for overcoming the reaction forces counteracting the movement of the member controlling the adjustment of the pump capacity. The piston 31 is operatively connected to the member 10r for adjusting the volumetric capacity of the main pump 10. Thus, if this piston 31 moves to the left (as seen in FIG. 1) in the body 30, as a consequence of an increment in said reaction forces or resistance, it causes the pressure in chamber 32 to rise and therefore an increment in the thrust exerted in said chamber against the piston 31. Therefore, this thrust counteracts the possible increment in the efforts counteracting the movement of said member 10r provided for adjusting the volumetric capacity of the main pump 10.

In contrast thereto, if the variation in the reaction forces tends to move the piston 31 outwards in cylinder 30, the orifice 35 will open and produce a pressure drop in chamber 32. This pressure drop prevents the piston 31 from moving outwards. The diameter of the gauged orifice 35 is so calculated that a moderate relative movement of rod 24 and piston 31 is attended by a substantial variation in the pressure in chamber 32. Under these conditions, the piston 31 remains at a substantially constant distance from rod 24, irrespective of the reaction stress exerted on the main pump adjustment member, provided that the cross-sectional areas of chambers 32 and 33 are sufficiently large. Thus, to any movement of piston rod 24 caused by a variation in the pressure P1 or P2 there corresponds an identical movement of piston 31. Therefore, the tractive effort amplifier is of the follower type.

The loss of pressure at 34 is calculated in such a manner that the feed input to chamber 32 (from chamber 33) permits a sufficient rate of movement of piston 31. A spring 36 urges the piston 31 towards the piston rod 24 when the thermal engine 11 is inoperative.

The energizing currents $i_1$ and $i_2$ of solenoid-operated valves 22, 23 are supplied by an electronic governor shown diagrammatically at 37 in FIG. 1, this governor receiving the information concerning the working depth displayed by a first set of position sensors 38 and 39 responsive to control levers 40 and 41, respectively.

This governor 37 also receives information concerning the actual position of the agricultural tools and also information concerning the actual tractive effort through a second set of sensors comprising a sensor 42 for detecting the position of a member mechanically connected to the tools, such as the lever 3 and a sensor 43 for detecting the mean position of draft links 5. The position of these draft links 5 is the picture of the sum of the tractive efforts applied to each link 5 since these efforts produce a proportional deflection of the relatively stiff resilient members 7. Now this mean position may be detected, for example, at an intermediate point of the bar 44 interconnecting the ends of said links 5. It is also possible to provide a position sensor at each end of links 5 and calculate the mean position through electronic means.

Furthermore, it is also possible to transmit the tractive effort to the sensor 43 via a resilient transmission member 50 to be described presently.

Figure 2:
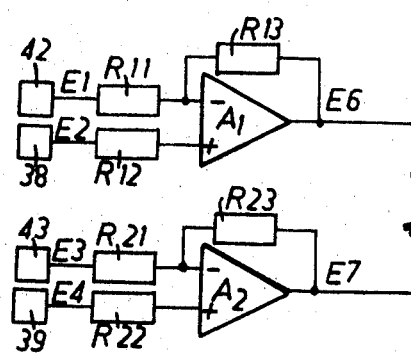
FIG. 2 is a wiring diagram of the governor.
Figure 2:
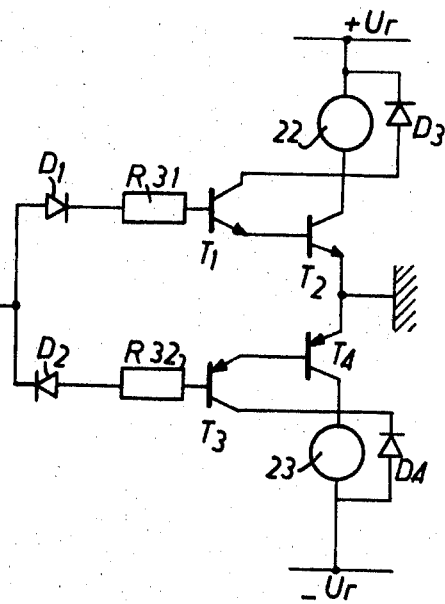

FIG. 2 illustrates the wiring diagram of the governor which comprises two paths, i.e., the path of amplifier A1 and that of amplifier A2. The path of amplifier A1 receives the voltage E1 from the sensor detecting the actual position of the tools, and the voltage E2 delivered by the sensor 38, which depends on the displayed working depth. It will be assumed that these voltages are positive and substantially proportional to the working depth, whether actual or simply displayed. The amplifier A1 delivers an output voltage E6 proportional to the discrepancy between the actual working depth of the tools and their displayed depth. The voltage E6 is positive if the actual depth of the tools is greater than the displayed depth position, and negative in the opposite case. The resistors R11 and R12 inserted at the inputs of amplifier A1 permit of adjusting the sensitivities of sensors 42 and 38, respectively, and the resistor R13 defines the feedback of amplifier A1.

The path of amplifier A2 receives the voltage E3 from the sensor 43 for detecting the actual tractive effort, and also the voltage E4 from sensor 39 for detecting the displayed tractive effort. As in the preceding case, it will be assumed that these voltages E3 and E4 are positive and proportional to the magnitudes to be measured. This amplifier A2 delivers a voltage E7 proportional to the discrepancy between the actual tractive effort and the displayed tractive effort. This voltage E7 is positive if the actual effort is greater than the displayed effort, and negative in the other case. Resistors R21 and R22 are provided for adjusting the sensitivities of said sensors, and another resistor R23 determines the feedback of amplifier A2.

A selector I enables the driver to use the tractor lifting device either under the control of the tractive effort or under the control of the working depth. The voltage E8 resulting from the selection of voltages E6, E7 is adapted, according to its polarity, to energize either the solenoid-operated valve 22 or the other solenoid-operated valve 23 controlling the main monitoring actuator device 17. Each solenoid-operated valve has its winding inserted as a load collector in the output circuit of a transistor designated by the reference symbols $T_2$ and $T_4$, respectively, these two transistors being of the complementary type, i.e., a NPN transistor and a PNP transistor, respectively, with grounded emitters. Each transistor $T_2$, $T_4$ is connected to said selector I via a circuit comprising in cascode from said selector a diode $D_1$ or $D_2$, one diode $D_1$ being mounted as a direct or through diode, and the other $D_2$ in the reverse direction, an input resistor R31 or R32, and a transistor $T_1$ or $T_3$ having their emitter connected to the base of a following transistor $T_2$ or $T_4$, the two transistors $T_1$, $T_2$ or $T_3$, $T_4$ having their collectors interconnected, respectively. The input resistors permit of adjusting the base current of the corresponding transistor $T_1$ or $T_3$ and therefore the gain of the cascode transistors.

If the voltage E8 is positive (this meaning an excessive working depth or an excessive tractive effort), current will flow through the diode $D_1$ and transistors $T_1$ and $T_2$ become conducting and energize the solenoid-operated valve 22, the current flowing through the winding of this valve being substantially proportional to said voltage E8. As the other diode $D_2$ is blocked or non-conductive, the other solenoid-operated valve 23 is not energized and the pressure P2 is zero while the value of pressure P1 corresponds to said voltage E8. As a consequence of the movement of rod 24 and piston 31 (FIG. 1) the volumetric capacity of the main pump 10, on the one hand, and the feed input to lifting actuator 1, on the other hand, become such that they permit the correction of the erroneous position or effort caused by said voltage E8.

Conversely, if the voltage E8 is negative, i.e., when the tools height is excessive or the tractive effort too low, the diode D1 becomes non-conducting and the other diode D2 receives current permitting the energization of solenoid-operated valve 23 through transistors $T_3$ and $T_4$, the current flowing in the valve winding being substantially proportional to the aforesaid voltage E8, in order to control the downward movement of the tools. The resistor R32 inserted between the diode D2 and the base of transistor $T_3$ permits of adjusting the gain of the means controlling the downward movement of the tool. Other diodes D3 and D4 branched off the solenoid-operated valves 22 and 23, respectively, are adapted to protect the transistors $T_2$ and $T_4$ when the valve energizing currents are zeroed.

Figure 3:
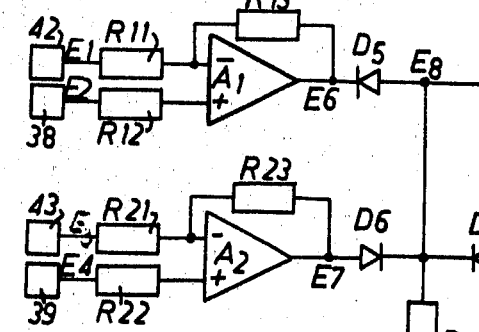
FIG. 3 is a wiring diagram of a modified form of embodiment of said governor.
Figure 3:
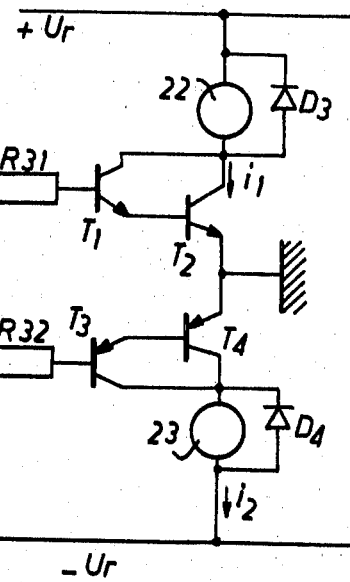

In a modified form of embodiment of said governor illustrated in FIG. 3 the selector I is replaced by an electronic circuit permitting of controlling the solenoid-operated valves 22 and 23 as a function of the values of voltages E6 or E7. Since the lifting order corresponds to positive voltages E6 and E7, two diodes D5 and D6, inserted in the output of amplifier A1 or A2 permitting of selecting the more positive of these voltages, are used. A resistor R33 rated to the lowest negative potential and connected to the outputs of said diodes D5 and D6, and to the inputs of diodes D1, D2, permits this selection if the voltages E6 and E7 are negative, i.e., when a downward movement of the tools is ordered by the two paths of this governor. The selected voltage E6 or E7 is the voltage ordering the smallest downward movement of the tools.

When the driver wishes to work with the implements at a constant depth, he sets the depth display lever 40 to the selected value, and the tractive effort display lever 41 to the maximum permissible value contemplated or tolerated, which must be higher than the tractive value corresponding to the requested tool depth. Now since in this case, the actual tractive effort is lower than the displayed effort, the output voltage E7 of amplifier A2 will be strongly negative. Thus, the path of amplifier A1 will regulate the depth by energizing the solenoid-operated valve 22 (controlling the lifting movement) if the implements are too low, and the other solenoid-operated valve 23 (controlling the downward movement) if these implements are too high. With the depth properly adjusted, if the soil compactness become suddenly greater so that the tool tractive effort exceeds the maximum value preset by means of the lever 41, the output voltage 27 of amplifier A2 will become again positive and thus an upward movement of the tools will be ordered to restore the tractive effort to the displayed preset value. Then, voltage E7 will drop to zero or nearly zero.

If the tools are higher with respect to the preset value displayed by the lever 40, the output voltage E6 of amplifier A1 will be negative and assume the highest of the two values E6 and E7, so that it is the voltage E7 that will be selected to permit the energization of solenoid-operated valve 23, if the soil hardness becomes again normal, the tractive effort will drop again below the preset limit and the voltage E7 will become again strongly negative. The less negative voltage E6 will control via transistors $T_3$ and $T_4$ a downward movement of the tools until the preset or displayed depth is restored.

It will also be seen that the energizing current of valve 22 (or 23) is substantially proportional to errors occurring in the position or in the effort. The pressure P1 (or P2) will therefore be substantially proportional to the error, like the displacement of rod 24 and piston 31 (FIG. 1). Then, the output of the main pump 10 will also be proportional to the error, and this will improve the control stability.

These basic functions may if desired be completed by auxiliary functions.

The driver may lift completely the implements for performing a particular manoeuver (such as changing direction at the end of a field, for example), then lower the implements to the normal or preset working position or level, by momentarily depressing a special control button and without having to modify the orders concerning the working depth and tractive efforts preset by means of the control levers 40 and 41.

Similarly, since the lifting system operates by controlling the effort or depth, the driver may be led to sink the tractor implements into the ground at the beginning of a working run or stretch. He should be able to perform this manoeuver without altering the values displayed by means of the control levers 40 and 41, by holding depressed the control knob used for the preceding manoeuver, in the implement lowering direction, during the time necessary therefor.

Figure 4:
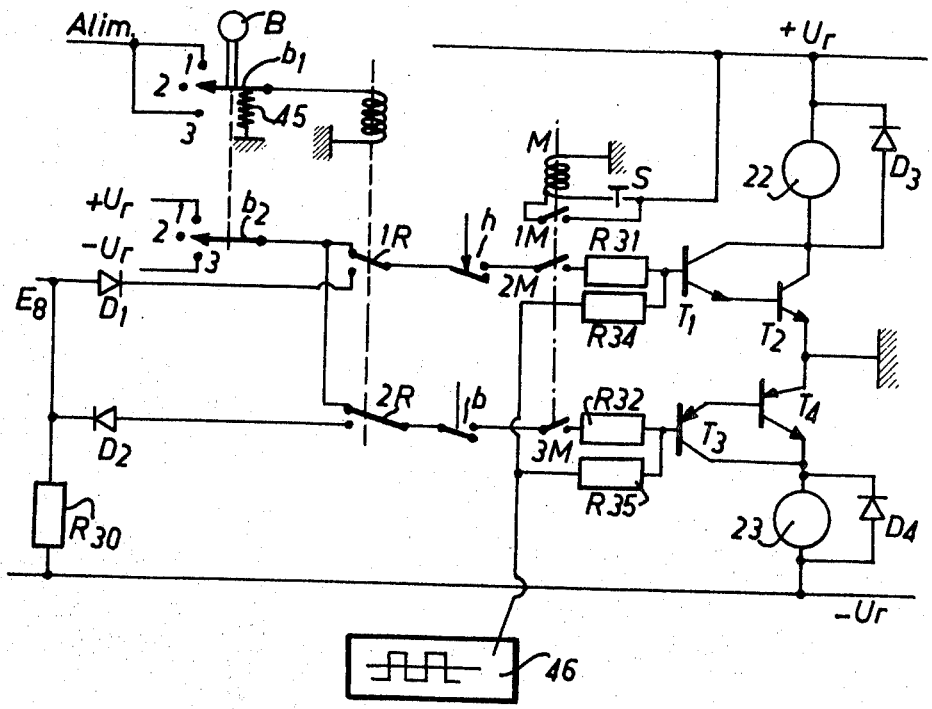
FIG. 4 is the wiring diagram of another modified form of embodiment of said governor.

FIG. 4 illustrates a modified wiring diagram of governor 37 which incorporates the above-mentioned auxiliary functions. The tool control lever B has three positions, namely position "1" for obtaining the maximum implement lifting movement, in which position the lever is retained by mechanical locking means; position "2" also provided with mechanical locking means and corresponding to the normal operation of the members controlling the implement depth and the tractive effort; finally, position "3" is a temporary one in that when the lever B is moved to this position and then released, it is urged automatically to position "2" by a spring 45. This position "3" corresponds to the downward movement of the implements beyond their normal working position.

This control lever B is operatively connected to a pair of electric contacts $b1$ and $b2$. Contact $b1$ is adapted to energize the relay R when control lever B is either in position "1" or in position "3." Contact $b2$ is such that the positive voltage denoted $+Ur$ is available in position "1" and the negative voltage denoted $-Ur$ is available in position "3." Said relay R has two reversing contacts 1R and 2R for switching from the normal control voltage E8 to said voltage $+Ur$ when lever B is in position "1" and to voltage $-Ur$ when said lever B is in position "3." Opening the limit switches $h$ and $b$ (corresponding to the high and bottom positions, respectively, of the piston of the lifting actuator), will discontinue the energization of solenoid-operated valves 22 and 23, respectively. The upper limit switch $h$ cuts out the supply of energizing current to valve 22 in the lifting direction and the other limit switch $b$ cuts out the supply of energizing current to the other valve 23 in the implement downward direction.

Thus, when the driver sets the control lever B in position "1," relay R is energized, contact 1R in the position illustrated delivers the positive voltage $+Ur$ to the base of transistor $T_1$ controlling transistor $T_2$, so that the implement-lifting, solenoid-operated valve 22 is energized until the limit-switch $h$ cuts out the supply of current to transistor $T_1$, thus stopping the tool lifting movement.

When the driver wants to restore these implements to their normal working position, with due consideration for the positions of control levers 40 and 41, he moves the lever B to position "2." Reversing the contacts 1R, 2R of relay R will restore the normal adjustment through amplifiers A1 and A2 and diodes D1 or D2.

It will be noted that when the positive voltage $+Ur$ is fed simultaneously to transistor $T_1$ and to the base of transistor $T_3$, the only consequence is that this transistor $T_3$ becomes nonconducting, so that the solenoid-operated valve 23 is de-energized completely.

To lower the tools beneath their normal working position, the lever B is set and maintained in position "3," thus energizing the winding of relay R and delivering to the bases of transistors $T_1$ and $T_3$ a negative voltage $-Ur$. Thus, transistor $T_1$ becomes non-conducting and transistor $T_3$ becomes conducting so that transistor $T_4$ is energized and energizes in turn the valve 23 controlling the downward movement of the tools until the limit-switch $b$ de-energizes transistor $T_3$ or the driver releases the control lever B, the latter then resuming automatically the position "2" due to the presence of return spring 45.

The governor illustrated in FIG. 4 further comprises a safety device preventing any movement of the lifting actuator 1 when the internal combustion engine 11 has been started, until the driver has depressed a safety push-button S. It will be seen that depressing this push-button S will energize an auxiliary relay M comprising three front contacts 1M, 2M and 3M, this relay remaining self-energized through its first or holding contact 1M. The other contacts 2M, 3M de-energize the bases of transistors $T_1$ and $T_3$ when the auxiliary relay M is deenergized.

In this example the auxiliary relay M is shown as being energized by the regulating voltage $+Ur$. Of course, this auxiliary relay M may also be energized by means of the output voltage generated by the dynamo or like generator of the thermal engine.

In fact, should the engine stall, the auxiliary relay M would be released. In this case the driver must depress the push-button S after re-starting the engine so that the orders from the governor be transmitted to solenoid-operated valves 22 and 23. Thanks to this safety function any untimely or unexpected movement of the tools when starting the thermal engine is positively prevented.

It will be noted that the non-return valve 13 (FIG. 1) is already adapted to prevent the tools from being "dropped" in case of leakage in pump 10, so that the implements remain in position if the actuator includes a sealing packing.

Other safety devices may be provided to prevent any sudden movement of the implements when starting the thermal engine and thus avoid any untimely actuation of the display control levers 40, 41 when the tractor is at a standstill. Thus, for instance, means for automatically locking these levers 40 and 41 as well as the lever B when the engine is inoperative may be contemplated.

Alternatively, a safety device of the type adapted to prevent the thermal engine from being started unless the position of the tractor implements is exactly coincident with the position displayed by the lever 40 or B, and if the lever for displaying the preset tractive effort 41 is not in its zero-effort position. Such undesired position may be detected by checking the control voltages of transistors $T_1$ and $T_3$ which must be zero. Moreover, a failure or defect tell-tale lamp may be provided to enable the driver to set his control levers 40, 41 and B in the proper position for starting the engine. In this case the push-button S may be dispensed with.

Since the adaptation of such safety devices is within the skill of anybody conversant with the art, these devices are not shown herein. It will be noted that the device for adjusting the volumetric capacity of the main pump 10 is such that this capacity becomes zero when the thermal engine is stopped, to avoid any fluid output in the lifting actuator when starting the engine.

A multivibrator 46 of a type known per se delivers an alternating voltage superposed to the normal control voltage ($+Ur$ or $-Ur$) via resistors R34 and R35 to the bases of transistors $T_1$ and $T_3$, this alternating voltage permitting the elimination of the possible hysteresis of solenoid-operated valves 22 and 23.

Figure 5:
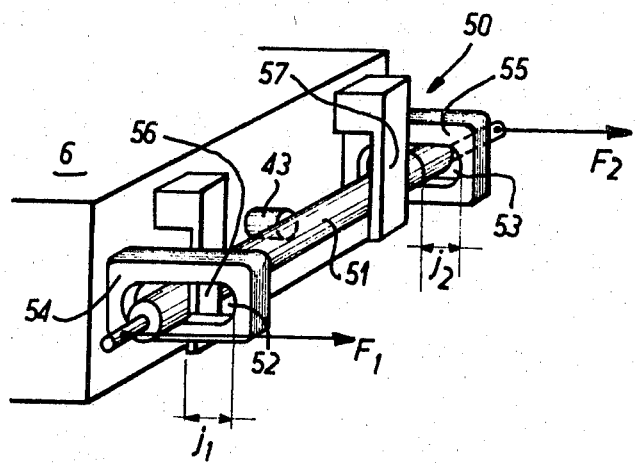
FIG. 5 illustrates the device for measuring the tractive effort.

A typical form of embodiment of the resilient member for transmitting the tractive effort 50 is illustrated in FIG. 5. The traction arms 5 are attached to the ends of a shaft 51 slidably engaged in a pair of elongated openings 52, 53 formed in a pair of spaced supports or brackets 54, 55 secured to the tractor chassis 6. A resilient member consisting of a pair of spring blades 56, 57 also secured to the tractor chassis counteract the tractive efforts F1 and F2 transmitted through the traction arms 5 to the shaft 51 and adapted to sag or bend by an amount proportional to F1 and F2, respectively. The sensor 43 detects the movement of the central portion of shaft 51 which corresponds to the sum of the tractive efforts F1 + F2. The clearances $J_1$ and $J_2$ left between the shaft 51 and the bottoms of openings 52 and 53, respectively, limit the sag of springs 56 and 57, and therefore the maximum stresses F1 and F2 transmitted by these springs 56 and 57 to the tractor chassis. If these tractive efforts F1 and F2 increase beyond these maximum values, the bottoms of openings 52 and 53 act as abutment means and the complementary effort is transmitted directly to the chassis 6 by the supports or brackets 54 and 55, thus avoiding any risk of damaging the springs 56 and 57 in case of abnormal stress due to a faulty maneuver.

The clearances $J_1$ and $J_2$ are so calculated that the corresponding sag of springs 56 and 57 permit the transmission of tractive efforts F1 and F2 slightly greater than the maximum efforts normally transmitted.

It will be noted that various means for protecting the sensor 43 may be contrived for avoiding the projection of stones, earth as well as accidental shocks.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is:

1. An electro-hydraulic apparatus for lifting tractor-drawn agricultural implements, comprising:
    coupling means for coupling a tractor-drawn agricultural implement to a tractor;
    at least one resilient member fixed to said tractor and engaging said coupling means and biasing said coupling means toward said tractor;
    hydraulic actuating means mounted to said tractor and engaging said implement for moving said implement in a direction opposed to the biasing direction of said resilient member;
    a variable output hydraulic displacement pump coupled between said hydraulic actuating means and a main pressurized fluid source;
    pump actuating means coupled to said variable output pump for adjusting the output of said variable output pump;
    manually operated selector means coupled to said variable output pump for selecting a desired draft effort of said implement;
    first sensor means for detecting the actual draft effort of said implement;
    second sensor means for sensing the output of said selector means;
    means coupled to said first and second sensor means for comparing said selected and detected actual draft efforts and generating a signal proportional to the difference therebetween; and
    means coupling the output of said comparing means to said pump actuating means to control the output of said variable output pump as a function of the output signal from said comparing means.

2. The apparatus according to claim 1, further comprising:
    second selector means coupled to said variable output pump for selecting a desired working depth of said implement;
    third sensor means for detecting the actual working depth of said implement;
    fourth sensor means for sensing the output of said second selector means; and
    second means coupled to said third and fourth sensor means for comparing the selected and detected actual working depths and generating a signal proportional to the difference therebetween, the output of said second comparing means being coupled to said pump actuating means to control the output of said variable output pump as a function of the output signal of said second comparing means.

3. The apparatus according to claim 2, further comprising switch means for selectively coupling the outputs of said first and second comparing means to said pump actuating means.

4. The apparatus according to claim 3, further comprising means coupled to said second comparing means for prohibiting transmission of the outputs of said second comparing means to said pump actuating means.

5. The apparatus according to claim 4, wherein said transmission prohibiting means comprises a manually engageable, automatically disengaging safety interlock switch interposed between said selective switching means and said pump actuating means.

6. The apparatus according to claim 2, further comprising an auxiliary control member coupled to said pump actuating means and having a first position for supplying a first constant signal to said pump actuating means to control movement of said implement in a first direction, a second position for supplying a second constant signal different from said first constant signal to said pump actuating means to control movement of said implement in a second direction, and a third position for connecting the outputs of said comparing means to said pump actuating means to control movement of said implement as a function of the outputs of said comparing means.

7. The apparatus according to claim 1, wherein said variable output pump has a variable volumetric capacity and a bidirectional output; and said pump actuating means comprises means to adjust the volumetric capacity and output direction of said pump and means to reduce the volumetric capacity of said pump substantially to zero when no signal appears at the input of said pump actuating means.

8. The appparatus according to claim 7, wherein said pump actuating means further comprises:
    a secondary source of pressurized fluid;
    a piston cylinder having first and second chambers separated by a piston;
    first and second conduits coupling said first and second chambers, respectively, to said secondary source;
    first and second solenoid operated valves interposed in said first and second conduits, respectively, to control the flow of fluid between said secondary source and said first and second chambers;
    a piston rod coupled to said piston, said rod being movable in opposite directions into first and second end positions, the stroke of the movement of said rod being a function of the fluid pressure respectively in said first and second chamber;
a further resilient member coupled to said rod and urging said rod normally into a rest position intermediate said first and second end positions;
a stress amplifier having a movable output member coupled to said piston rod and to said secondary source, the movement of said output member being a function of the position of said piston rod; and
means coupling said output member of said stress amplifier to said variable output pump such that the volumetric capacity of said pump is controlled as a function of the movement of said output member of said stress amplifier.

9. The apparatus according to claim 7, wherein said rest position corresponds to a substantially zero volumetric capacity of said pump and said first and second end positions correspond to maximum volumetric capacities in each of the two output directions of said pump, respectively.

10. The apparatus according to claim 9, further comprising:
a non-return valve interposed between said hydraulic actuating means and said variable output pump to prevent a return of fluid from said hydraulic actuating means to said variable output pump; and
means monitoring the flow of fluid through said non-return valve as a function of the fluid pressure of said secondary source.

11. The apparatus according to claim 10, wherein said monitoring means comprises a monitoring valve interposed between said secondary source and said non-return valve, and means coupling said monitoring valve to said stress amplifier to close said monitoring valve to discontinue monitoring of said non-return valve when said volumetric capacity of said pump approaches zero; said apparatus further comprising a second non-return valve coupled between said variable output pump and a fluid reservoir to permit fluid to flow in one direction from said reservoir to said pump.

12. The apparatus according to claim 8, further comprising means coupling the output of said comparing means to said first and second solenoid operated valves to control the operation of said valves as a function of the output signal from said comparing means.

* * * * *